United States Patent [19]

Ogo

[11] Patent Number: 4,476,569
[45] Date of Patent: Oct. 9, 1984

[54] X-RAY FIELD DEFINING MASK

[75] Inventor: Yoshimasa Ogo, Ootawara, Japan

[73] Assignee: Tokyo Shibaura Denki Kabushiki Kaisha, Kawasaki, Japan

[21] Appl. No.: 440,618

[22] Filed: Nov. 10, 1982

[30] Foreign Application Priority Data

Jan. 27, 1982 [JP] Japan .................................. 57-11207

[51] Int. Cl.³ ............................................... A61B 6/00
[52] U.S. Cl. .................................... 378/175; 378/147
[58] Field of Search ............... 378/150, 151, 176, 147, 378/188, 175

[56] References Cited

U.S. PATENT DOCUMENTS

| | | | |
|---|---|---|---|
| 3,862,426 | 1/1975 | Thomas | 250/402 |
| 3,944,838 | 3/1976 | Gäde | 378/147 |
| 4,146,793 | 3/1979 | Bergstrom et al. | 250/444 |
| 4,214,167 | 7/1980 | Gäde | 378/147 |
| 4,266,139 | 5/1981 | Sportelli et al. | 378/147 |

Primary Examiner—Alfred E. Smith
Assistant Examiner—T. N. Grigsby
Attorney, Agent, or Firm—Oblon, Fisher, Spivak, McClelland & Maier

[57] ABSTRACT

In a spot film device, a cassette assembly for a film cassette is mounted for reciprocating in a tunnel between an X-ray exposure position and a position in which the cassette is automatically unloaded or loaded with film. Field defining masks are also mounted for translating selectively with the carriage. The masks are formed of the synthetic materials having minimal X-ray absorption and high rigidity, without an aperture, to define a sharp X-ray field.

8 Claims, 7 Drawing Figures

X-RAY BEAM

X-RAY FIELD DEFINING MASK

BACKGROUND OF THE INVENTION

1. Field of the Invention

This invention relates to X-ray spot film devices, and more particularly, to an improvement in an X-ray field defining mask which is used in conjunction with an X-ray spot film device of an X-ray table to make a selected number of radiographic exposures on a single film.

2. Description of the Prior Art

Conventional spot film devices usually include a frame support extending width-wise over the top of an X-ray table. A main carriage is mounted on the support to be advanced from a rear parked position to a forward radiographic position wherein a film holder carried by the carriage is disposed in alignment with an X-ray beam that is projected from an X-ray source in the table through a patient. The film holder is mounted in a tray supported on an inner carriage which is translatable widthwise of the main carriage so that the center of the X-ray beam may be made coincident with the area on the film holder on which a spot film exposure is desired. The area is further defined by superimposable X-ray field defining masks.

As is well known, spot film devices are also provided with a fluoroscopic device which permits an examining radiologist to visualize anatomy of interest and to make one or more radiographs in a choice of sizes by projecting the film holder forward and shifting it and the masks to obtain the desired sequence of radiographs. The fluoroscopic device on the spot film device is aligned with the X-ray source in the table, and the film cassette is, of course, retracted from the beam fluoroscopy. The film holder may be shifted relative to the masks to expose different areas of the film and to make exposures of different sizes.

In prior art spot film devices two X-ray field defining masks having elongated rectangular apertures disposed at right angles to each other are used. The masks are mounted for translating on a pair of tracks which are arranged in parallel near opposite margins of the support. These masks are translated by a respective mask drive system including a reversible servo motor. One of the masks is moved manually into the X-ray beam when two adjacent widthwise exposures are to be made on the film. The other mask is disposed in the beam when two adjacent exposures lengthwise of the film are desired. The masks are superimposed so that their rectangular apertures are widthwise. The film is positioned for exposing a quadrant or corner area of the film, and then the film may be shifted three more times to expose the remaining three quadrants.

The mask is made in a laminar fashion so it will have lightweight strength and yet have sufficient X-ray attenuation in the proper areas to cut off undesired portions of the X-ray beam and define a sharp field. The laminates are a stiff sheet such as stainless steel or brass on which a thinner lead sheet is bonded.

An example of the conventional spot film device is disclosed in U.S. Pat. No. 3,862,426 issued Jan. 21, 1975. Such masks have, however, certain undesirable characteristics. For example, the mask has greater external dimensions than the X-ray film or film holder. This requires the spot film device have a large space for a parked position to which the masks are retracked. The mask is made of stacked stiff sheet metals so that the power on the driving system for driving the mask through most of its travel is increased in proportion to the weight of the mask. Furthermore, the longitudinal edge of the aperture in the mask is flexual due to its low flexural rigidity. Attempts have been made to prevent collision of the longitudinal edge with the leading edge of the mask by spacing the tracks in which the masks slide in a direction perpendicular to the mask sliding plane. However, such a spacing of the spot film device decreases the quality of the X-ray image.

SUMMARY OF THE INVENTION

Accordingly, it is an object of this invention to provide a novel X-ray field defining mask which is used in conjunction with an X-ray spot film device, to minimize the size of the mask and the external dimensions of the X-ray spot film device, and especially to reduce the length of the X-ray spot film device in the direction in which the film holder slides.

Another object of this invention is to provide a novel field defining mask which is lightweight, and has high strength and high flexural rigidity, and to reduce the time and the power consumed by the driving system in moving the masks between a radiographic position and parked position.

Still a further object of this invention is to provide a novel X-ray field defining mask which enables minimization of the distance between two mask sliding planes.

Basically, these and other objects are achieved according to this invention by providing a novel X-ray field defining mask which uses synthetic substances such as a cast resin strengthened by carbonic fibrous materials for transmission of X-rays instead of the conventional mask aperture.

According to a preferred embodiment of the present invention, the part which transmits X-rays to define an X-ray field is formed without an aperture, and the external dimension of the mask can be similar to that of an X-ray film.

According to a further advantageous feature of the present invention, the mask sliding planes for an upper mask and a lower mask are arranged closely in parallel, whereby blurring of an X-ray image on an X-ray film is decreased.

BRIEF DESCRIPTION OF THE DRAWINGS

A more complete appreciation of the invention and many of the attendant thereof will readily be obtained as the same becomes better understood by reference to the following detailed description when considered in connection with the accompanying drawings, wherein.

DESCRIPTION OF THE PREFERRED EMBODIMENTS

Figure 1:
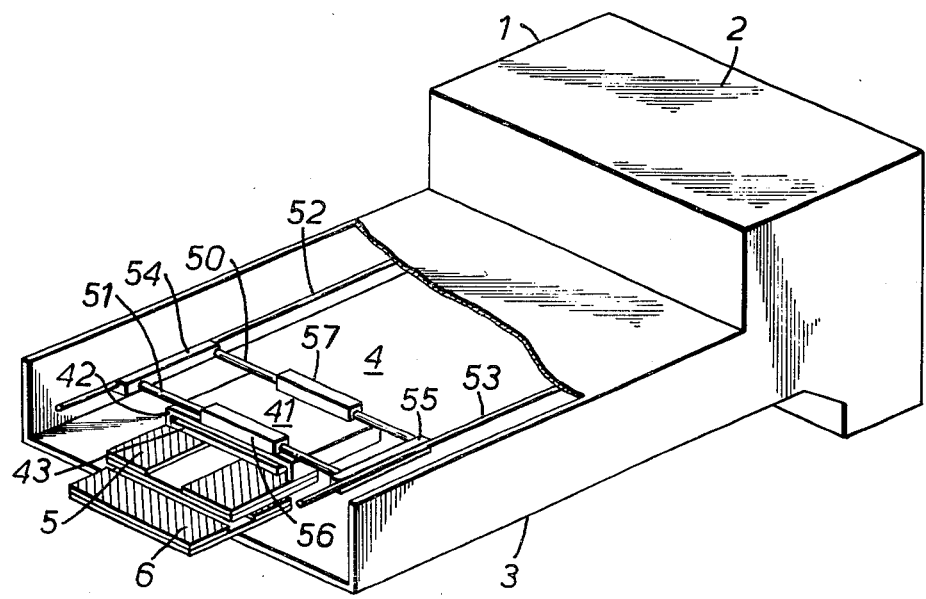
FIG. 1 is a perspective view of a spot film device employing the X-ray field defining masks of the present invention.
Figure 2:
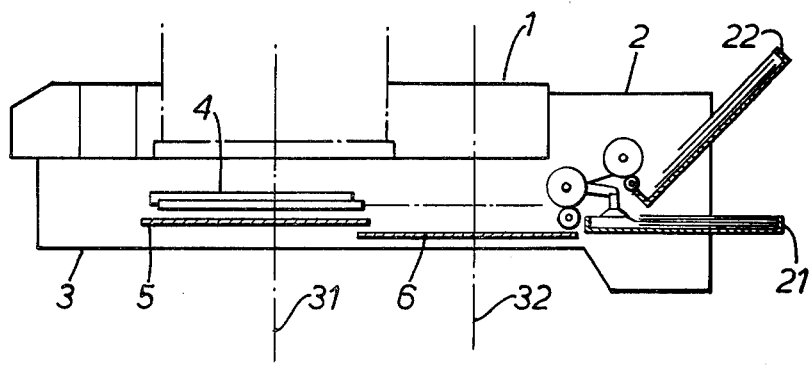
FIG. 2 is a side view of the spot film device shown in FIG. 1.

Referring now to the drawings, wherein like reference numerals designate identical or corresponding parts throughout the several views, and more particularly to FIGS. 1 and 2 thereof, the spot film device is generally indicated at 1 and includes a housing having an upstanding portion 2 and a part forming a tunnel 3. Located in the upstanding portion 2 is a box-like film supply or feed magazine 21 and an exposed film receiving magazine 22. The tunnel 3 has an opening or window, not shown, such as for location of an X-ray image intensifier for fluoroscopy. A movable cassette assembly 4 is movable in tunnel 3 between a parked or a film loading and unloading position 31 and radiographic active position 32 where the X-ray beam may impinge thereon from below, as shown in FIG. 2. The cassette assembly 4 is transported between the forward active radiographic position 31 and the parked or film loading or unloading position 32. Furthermore, an inner carriage 41 mounted on the movable cassette assembly is shifted bidirectionally to take a series of radiographs on the same film.

The inner carriage 41 is carried on a pair of widthwise rods 50 and 51. A pair of parallel tracks 52 and 53 are mounted within the housing. The cassette assembly 4 slides on tracks 52 and 53. The cassette assembly 4 has sides 54 and 55 which may be provided with rollers and sleeve bearings, not shown. The inner carriage 41 has the sides 56 and 57 constructed like the sides 54, 55 of the cassette assembly 4. The inner carriage 41 includes a cover 42 for holding a cassette 43 which will be described in detail hereinafter. The cassette 43 includes a plate to which an X-ray intensifying screen on which the film rests during exposure is held, and a cover which includes a light metal plate to which is adhered a layer of resilient polyurethane foam on the bottom of which is another intensifying screen, not shown.

Masks 5 and 6 are mounted for translation on a pair of tracks 61 and 62 which are arranged in parallel.

The manner in which masks 5 and 6 are advanced to the radiographic position 31 and retracted to the parked position 32 will be described referring to FIG. 3. There is provided a respective reversible servo motor for both the lower and upper masks, respectively. Motor 7 drives or translates upper mask 6. Motor 8 drives lower mask 5.

The upper mask drive system includes a sprocket-like pulley 71 on the shaft of motor 7. Situated near the front end of the housing of the spot film device is an idler pulley 72 which is mounted for rotation. Running on drive pulley 71 and idler pulley 72 is an open loop belt which has opposite ends 73 and 74 that are connected to the leading and trailing edges of mask 5. Operation of motor 7 in one direction will retrack mask 5 to the parked position and rotation of the motor 7 in the opposite direction will advance mask 5 to the front of the spot film device 1, to the left in FIG. 3, for use in fluoroscopy if desired.

The drive system for lower mask 6 is similar to that for upper mask 5 which has just been described. It includes mask 6, a drive pulley 81 on the motor shaft and an idler pulley 82 spaced therefrom, and a belt loop which has opposite ends 83 and 84 connected to the leading and trailing edges of mask 6.

A preferred construction of a mask is illustrated in FIGS. 3, 4, 5 and 6 which show perspective views of one of the masks.

Figure 3:
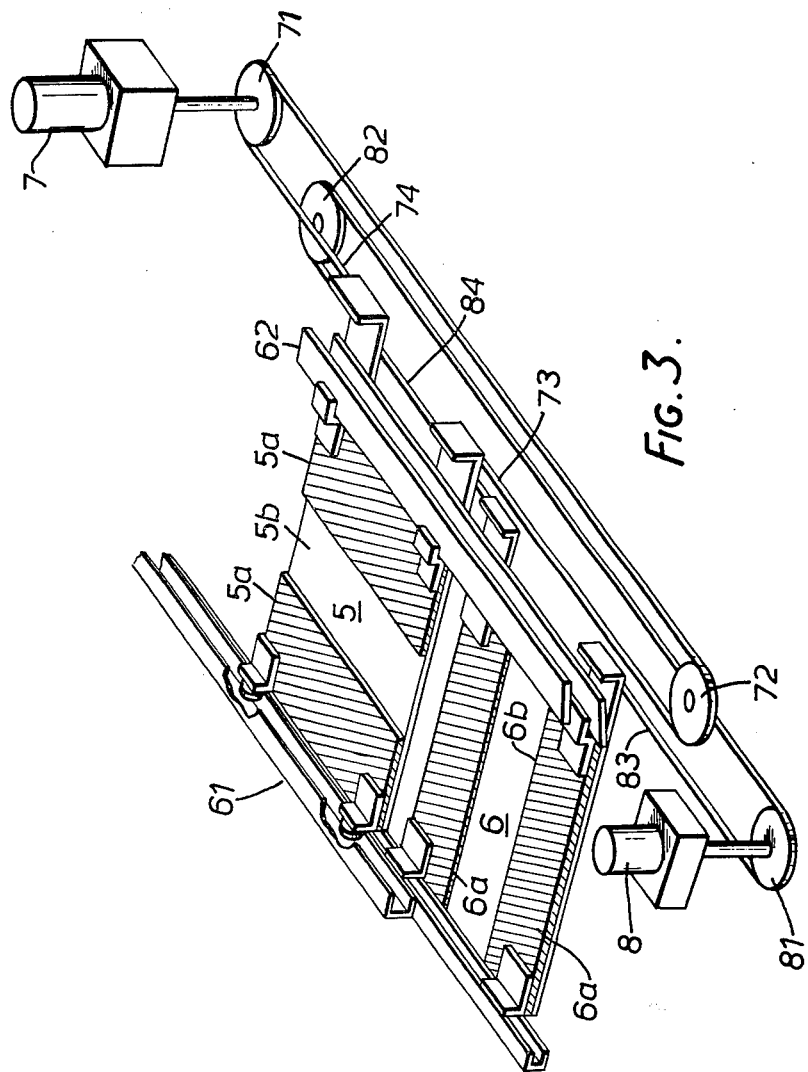
FIG. 3 is a perspective view of a driving mechanism for the X-ray field defining masks of the present invention.

In FIG. 3, the masks consists of respective top plates 5a, 6a and respective bottom plates 5b, 6b. The top plates 5a, 6a are made of an X-ray shielding material, such as lead, which will not permit the passage of an X-ray beam from the X-ray source to the X-ray film. The bottom plate 5b, 6b is made of a material which is transparent to X-rays and has a comparatively high rigidity, such as epoxyde cast resin strengthened with carbonic fibrous material. An X-ray transparent material is used as the material for producing a part of the masks which transmit X-rays to expose different area of the film and to make exposures of different sizes without a rectangular aperture. The top plates 5a, 6a can be bonded to the bottom plates 5b, 6b in the manner shown in FIG. 3. The use of carbon fiber tissue embedded in epoxy synthetic cast resin in a medical X-ray device is described in U.S. Pat. No. 4,146,793 issued Mar. 27, 1979.

In the fabrication of the upper mask 5, a pair of the top plates 5a made of X-ray shielding material are bonded to the bottom plate 5b made of X-ray transparent material longitudinally along with the tracks 61 and 62 to define a sharp X-ray field for exposing the rear and front halves of the film. The bonding agent or adhesive is an epoxy selected to have a low X-ray attenuation as well as the capability of being evenly distributed.

The lower mask 6 is fabricated like the upper mask 5 as above described. A pair of the top plates 6a made of X-ray shielding material are bonded to the bottom plate 6b made of X-ray transparent material perpendicularly to the tracks 61 and 62 to define a sharp X-ray field for exposing the right and left halves of the film. The external dimensions of the mask 5 and 6 are similar to that of the X-ray film, with the top plate having a thickness of about 1 mm, and the bottom plate having a thickness of about 0.5-2 mm.

Figure 4:
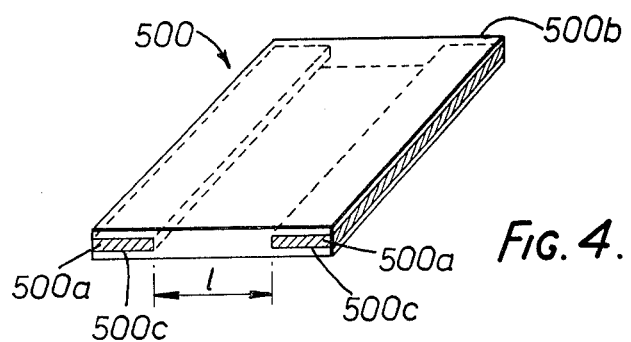
FIG. 4 is another embodiment of an X-ray field defining mask of the present invention.
Figure 5:
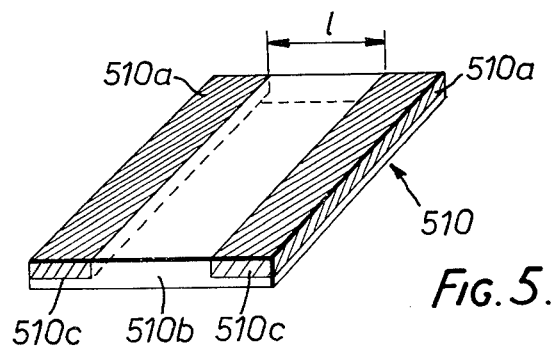
FIG. 5 is an alternate embodiment of an X-ray shielding structure for the X-ray field defining mask of FIG. 3.
Figure 6:
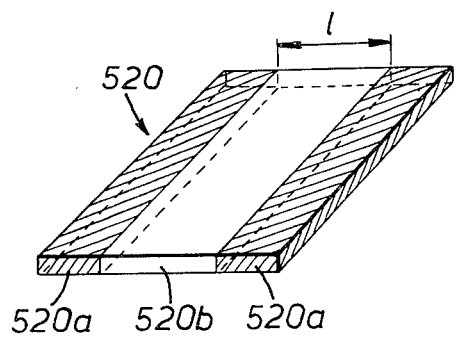
FIG. 6 is another alternate embodiment of an X-ray shielding structure for the X-ray field defining mask of FIG. 4.

Turning now to FIGS. 4, 5 and 6, further embodiments of the mask fabricated according to the invention are illustrated.

In FIG. 4, an X-ray transparent sheet 500b corresponding to the bottom plate 5b in FIG. 3 has a pair of planar grooves 500c formed in the edges thereof. The X-ray shielding sheets 500a corresponding to the top plates 5a in FIG. 3 are then formed inserted into the grooves 500c in the manner shown in FIG. 4. This mask 500 has a smaller thickness than the mask 5 consisting of two stacked plates.

In FIG. 5, the X-ray transparent plate 510b corresponding to the bottom plate 5b in FIG. 3 has elongated notches 510c which are located longitudinally in the upper portion of the plate 510b along the edges thereof. The X-ray shielding plates 510a corresponding to the top plates 5a in FIG. 3 tightly engage the elongated notches 510c. In the manner shown in FIG. 5, the height of the elongated notch 510c is the same as the thickness of the X-ray shielding plate 510a, and the width of the elongated notch 510c is similar to that of the X-ray shielding plate 510a.

Figure 7:
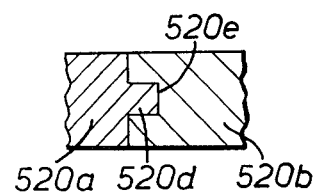
FIG. 7 is a partial cross-sectional view of the junction portion of the X-ray field defining mask shown in FIG. 6.

FIGS. 6 and 7 show a tongue and groove modification of the mask according to this invention. The mask 520 includes an X-ray transparent plate 520b and X-ray shielding plates 520a mounted flush with the X-ray transparent plate 520b. The X-ray shielding plate 520a has a planar projection 520b to engage a corresponding planar groove 520e formed on both sides of the X-ray transparent plate 520b. The planar projections 520d of the X-ray shielding plate 520a are firmly fitted in the corresponding planar grooves on both sides of the X-ray transparent plate 520b and bonded by a bonding agent or adhesive. This tongue in groove joining, as illustrated in FIG. 7, increases rigidity. In this joining, consider that the part which transmits X-rays in the X-ray transparent plate 520b is decreased by the inlaying of the projection 520b made of the X-ray shielding material.

In addition to polyphenyllne, it is possible to use polyester, epoxy phenolic, polyimide systems and all other epoxyde resins as the X-ray transparent material. Epoxyde synthetic resin strengthened with carbonic fibrous material has transparency for X-rays by reason of it containing only low atomic number elements.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An X-ray field defining mask for a spot film device adapted for use with an X-ray table, said spot film device having a mask driving means by which said X-ray field defining mask may be translated between a parked or a film loading and unloading position and a radiographic active position where an X-ray beam from an X-ray source may impinge on said mask, comprising:
    X-ray transparent plate means which is transparent to X-rays for transmitting X-rays; and
    X-ray shielding plate means disposed adjacent said transparent plate means and made of an X-ray shielding material for blocking the passage of the X-ray beam from said X-ray source to an X-ray film thereby to define an X-ray field in conjunction with said transparent plate means.

2. An X-ray field defining mask according to claim 1, comprising:
    a unitary fabricated structure including,
    a bottom plate made of an X-ray transparent material, and
    top plates made of an X-ray shielding material which are bonded to said bottom plate to define a sharp X-ray field.

3. An X-ray field defining mask according to claim 1, comprising:
    a unitary fabricated structure including,
    an X-ray transparent plate having edges in which a pair of planar grooves are respectively formed, and
    X-ray shielding plates which are inserted into said grooves of said X-ray transparent plate.

4. An X-ray field defining mask according to claim 1, comprising:
    a unitary fabricated structure including,
    an X-ray transparent plate having an upper portion with opposed edges located longitudinally in the upper portion, both edges provided with an elongated notch, and
    an X-ray shielding plate which engages both said elongated notches.

5. An X-ray field defining mask according to claim 1, comprising:
    a unitary fabricated structure including,
    an X-ray transparent plate having opposed sides provided with respective planar grooves formed therein, and
    X-ray shielding plates having planar projections fitted into respective of the planar grooves.

6. An X-ray field defining mask according to claim 1, wherein said X-ray transparent plate means comprises:
    an epoxyde synthetic resin strengthened with carbonic fibrous material.

7. An X-ray field defining mask according to claim 1, wherein said X-ray shielding plate means comprises: lead.

8. An X-ray field defining mask for a spot film device adapted for use with an X-ray table, said spot film device having a mask driving means for translating said X-ray field defining mask between a parked or a film loading and unloading position and a radiographic active position where an X-ray beam from an X-ray source may impinge on said mask, comprising:
    X-ray transparent plate means for transmitting the X-ray beam and having a size comparable to that of an X-ray film and which is made of an X-ray transparent material containing only low atomic number elements; and
    X-ray shielding plate means joined to said X-ray transparent plate means for defining in conjunction with said transparent plate means an X-ray field which transmits X-rays through said X-ray transparent plate means.

* * * * *